United States Patent [19]
Quaeck

[11] Patent Number: 5,222,593
[45] Date of Patent: Jun. 29, 1993

[54] RECIPROCATING FLOOR CONVEYOR AND DRIVE SYSTEM THEREFOR

[76] Inventor: Manfred W. Quaeck, 1515-210th Avenue NE., Redmond, Wash. 98053

[21] Appl. No.: 966,371

[22] Filed: Oct. 26, 1992

[51] Int. Cl.[5] .......................................... B65G 25/00
[52] U.S. Cl. .................................. 198/750; 414/525.1
[58] Field of Search ...................... 198/750; 414/525.1, 414/525.9

[56] References Cited

U.S. PATENT DOCUMENTS

| | | |
|---|---|---|
| Re. 33,196 | 4/1990 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom . |
| 4,492,303 | 1/1985 | Foster . |
| 4,580,678 | 4/1986 | Foster ................ 198/750 |
| 4,611,708 | 9/1986 | Foster . |
| 4,679,686 | 7/1987 | Foster . |
| 4,691,819 | 9/1987 | Hallstrom . |
| 4,727,978 | 3/1988 | Hallstrom . |
| 4,749,075 | 6/1988 | Foster . |
| 4,785,929 | 11/1988 | Foster . |
| 4,793,468 | 12/1988 | Hamilton et al. ........... 198/750 |
| 4,856,645 | 8/1989 | Hallstrom . |
| 4,940,132 | 7/1990 | Foster . |
| 4,962,848 | 10/1990 | Foster ................ 198/750 |
| 4,990,048 | 2/1991 | Foster ................ 198/750 |
| 5,064,052 | 11/1991 | Foster . |
| 5,088,595 | 2/1992 | Hallstrom . |
| 5,096,356 | 3/1992 | Foster . |
| 5,103,866 | 4/1992 | Foster . |
| 5,125,502 | 6/1992 | Foster . |
| 5,145,309 | 9/1992 | Foster ................ 198/750 |

*Primary Examiner*—Joseph E. Valenza
*Attorney, Agent, or Firm*—Graybeal Jackson Haley & Johnson

[57] ABSTRACT

The reciprocating floor conveyor of the present invention includes a supporting frame, a plurality of base members on the supporting frame, a plurality of elongate, slidable slats mounted on the base members, and a drive mechanism for causing longitudinal reciprocative movement of the plurality of slats. The plurality of slats are divided in at least a first and second interleaved groups. Each slat is connected to the slats adjacent thereto through slidable engagement of the sides of the slats, and are supported by the base members such that the first group of slats is elevated a greater distance from the supporting frame than the second group of slats. The drive system of the present invention is employed wherein the reciprocating floor conveyor is comprised of at least three slat groups each having at least one slat member each. The drive system moves all of the slat groups simultaneously in an extended, conveying direction and moves each of the slat groups sequentially in an opposite, retracted direction. The drive system includes a fluid source, at least three fluid-driven cylinders which each cause reciprocation of a slat group, a fluid-driven timing cylinder for each slat group, a direction valve for alternately extending and retracting the slat groups, and first and second flow regulators which each control fluid flow from the drive cylinders of a particular slat group to the fluid source when the slat groups are all extended to sequentially retract the slat groups.

21 Claims, 3 Drawing Sheets

RECIPROCATING FLOOR CONVEYOR AND DRIVE SYSTEM THEREFOR

BACKGROUND OF THE INVENTION

The invention pertains to reciprocating conveyors, and more specifically, to reciprocating conveyors which provide sequential movement of a load thereon by simultaneous movement of all of the slats in the load conveying direction, and sequential return of the plurality of slat groups.

Reciprocating conveyors providing continuous movement are generally known in the art. U.S. Pat. No. 4,580,678, issued to Foster, discloses a reciprocating floor conveyor system in which a group of six floor slat members, staggered in a position relative to each other, are each first advanced and then sequentially returned such that five slats are moving forwardly while one slat moves in the return direction. The Foster reciprocating floor conveyor requires two separate sources of hydraulic pressure, one for advancing the floor slat members and another for retracting the floor slat members. This requirement for two separate hydraulic pressure sources increases the cost and complexity of the mechanism. The reciprocating floor conveyor of Foster does not provide hydraulic flow of a constant rate, regardless of flow pressure, to each individual slat. Thus, if some slats experience a greater load than others, the slats experiencing this greater load will move a lesser distance than the slats experiencing a lesser load, or not at all, and the sequential advance of the slats will be disrupted due to this lack of substantially constant flow rate in the respective hydraulic lines.

U.S. Pat. No. 4,144,963, issued to Hallstrom, discloses a reciprocating conveyor in which at least three elongate slats are employed such that there are always a greater number of slats moving simultaneously in a conveying direction than the number of slats moving in the opposite direction. In order to achieve the above slat movement, the Hallstrom patent requires a complex fluid pressure control valve having relatively movable first and second valve members. The first valve member has a plurality of first passageways each communicating with a different extensible fluid pressure cylinder. The second valve member has a common second passageway communicating simultaneously with more than half of the first passageways, and a third passageway communicating with the remaining first passageway. One of the first valve member and the second valve member is moved relative to the other to communicate the second and third passageway selectively with different ones of the first passageways. In addition to the above unduly complex fluid pressure control valve, the Hallstrom patent is also limited by the fact that, like the above Foster patent, substantially constant flow rate, regardless of flow pressure, is not provided. Thus, as stated above, the presence of unequal loads on respective slats will cause disproportionate slat movement resulting in disruption of the slat sequence.

U.S. Pat. No. 3,534,875 discloses a slat conveyor having three groups of slats, two of which move simultaneously in a load-conveying direction, while at the same time, the third group moves in the opposite direction to provide continuous movement.

In U.S. Pat. Nos. 4,143,760 and 4,611,708, three groups of slats all move simultaneously in a first load conveying direction and then each individual group moves sequentially in the opposite direction to cause sequential load movement. U.S. Pat. No. 4,856,645 teaches a slat conveyor having a group of non-moving "dead" slats spaced between two groups of slats that move simultaneously in a load conveying first direction and sequentially in an opposite direction for sequential load movement.

U.S. Pat. No. 4,157,761 discloses a discharge mechanism for discharging particulate loads that includes first and second stoker rods each having a plurality of cross bars. A fixed floor angle is located between each of the cross bars. The first and second stoker rods reciprocate lengthwise, rapidly, and, at the same time but out of phase.

U.S. Pat. Nos. 4,492,303; 4,679,686; 4,749,075; and 4,785,929 all issued to Foster disclose various components for reciprocating floor conveyors including hold-down members, bearing systems, and drive/guide systems.

A need thus exists for a reciprocating floor conveyor able to sequentially move heavy loads of, for example, one million pounds or more.

A need exists for the above type of reciprocating floor conveyor in which the slats are engaged, but slidable, to prevent passage of the particulate load matter therebetween.

A need exists for the above type of reciprocating floor conveyor in which adjacent slat members are oriented at different elevations above the conveyor floor to facilitate adjacent slat engagement.

A need exists for the above type of reciprocating floor conveyor in which each slat member is controlled by a separate fluid-driven cylinder, and in which each group of slat members is controlled by a separate timing cylinder.

SUMMARY OF THE INVENTION

In accordance with the invention, a reciprocating floor conveyor is provided. The reciprocating floor conveyor includes a supporting frame, a plurality of base members on the supporting frame, a plurality of elongate, slidable slats mounted side by side on the base members, and drive means for causing longitudinal reciprocative movement of the plurality of slats. The plurality of slats are divided in at least a first group and a second group interleaved with the first group. The slats of the first group and of the second group are oriented such that each slat is connected to the slats adjacent thereto through slidable engagement of the sides of the slats. The slats are supported by the base members such that the first group of slats is elevated a greater distance from the supporting frame than the second group of slats.

In the preferred embodiment, the drive means is comprised of a plurality of drive cylinders, and each drive cylinder causes reciprocation of one, and only one, of the slats. Most preferably, the plurality of slats are substantially U-shaped in cross-section, and there are two elongate base members supporting each slat. The drive cylinder is connected between the two base members and is attached to the slat, which slides on a bearing on the upper surface of each base member.

The drive system for the reciprocating floor conveyor of the present invention is preferably employed wherein the reciprocating floor conveyor is comprised of at least three slat groups each having at least one slat member each. The drive system moves all of the slat groups substantially simultaneously in an extended, conveying direction and moves each of the slat groups sequentially in an opposite, retracted direction. The drive system includes a fluid source, at least three fluid-driven cylinders which each cause reciprocation of a slat group, a fluid-driven timing cylinder for each slat group, a direction valve for alternately connecting the piston side and the rod side of the drive cylinders to fluid flow (i.e., for extending and retracting the slat groups), and first and second flow regulators which each control fluid flow from the drive cylinders of a particular slat group to the fluid source when the rod side of the drive cylinders is connected to fluid flow (i.e., when the slat groups are all extended) to sequentially retract the slat groups. The drive system also includes means for controlling the direction valve which moves the direction valve from its first position (in which fluid flows to the rod side of the drive cylinders) to its second position (in which fluid flows to the piston side of the drive cylinders) to extend the slat members after all of the slat members have retracted. The means for controlling the direction valve also moves the direction valve from its second position (in which fluid is provided to the piston side of the drive cylinders) to its first position (in which fluid is provided to the rod side of the drive cylinders) to retract the slat members after all of the slat members have extended.

The drive system also has a means for controlling the first flow regulator and second flow regulator which causes sequential retraction of the slat groups. After all of the slat members have been extended, the direction valve is then configured in its first position to allow retraction of the slats, and the first fluid regulator and the second fluid regulator are configured by the means for controlling the first flow regulator and second flow regulator to prevent fluid flow from their connected fluid drive cylinders to the fluid source. Thus, fluid only flows from the drive cylinders not connected thereto to the fluid source, resulting in retraction of the first slat group. The means for controlling the first flow regulator and second flow regulator then configures the first flow regulator such that fluid flows from the connected drive cylinders to the fluid pressure source resulting in retraction of the second slat group. Next, the means for controlling the first flow regulator and second flow regulator configures the second flow regulator such that fluid flows from the connected drive cylinders to the fluid source, resulting in retraction of the third slat group. Finally, the means for controlling the direction valve orients the direction valve in its second position to extend all of the now retracted slat members of the three slat groups. The means for controlling the direction valve then again orients the direction valve in its first position after slat extension and the above described sequential retraction of the slat groups occurs, as controlled by the means for controlling the first flow regulator and second flow regulator.

Preferably, a single timing cylinder is present for all of the drive cylinders of a slat group. The timing cylinders function such that the means for controlling the direction valve moves the direction valve from its first position, in which the rod side of the drive cylinders receive fluid flow, to its second position, in which the piston side of the drive cylinders receive fluid flow, to cause extension only upon retraction of the timing cylinder of the slat group that is sequentially the last to retract. Additionally, the timing cylinders function such that the means for controlling the direction valve moves the direction valve from its second position to its first position to cause retraction only upon extension of the last to extend of the simultaneously extending timing cylinders.

BRIEF DESCRIPTION OF THE DRAWINGS

These and other features of the invention will be more fully appreciated when considered in light of the following specification and drawings in which.

DETAILED DESCRIPTION OF THE PREFERRED EMBODIMENTS

Figure 1:
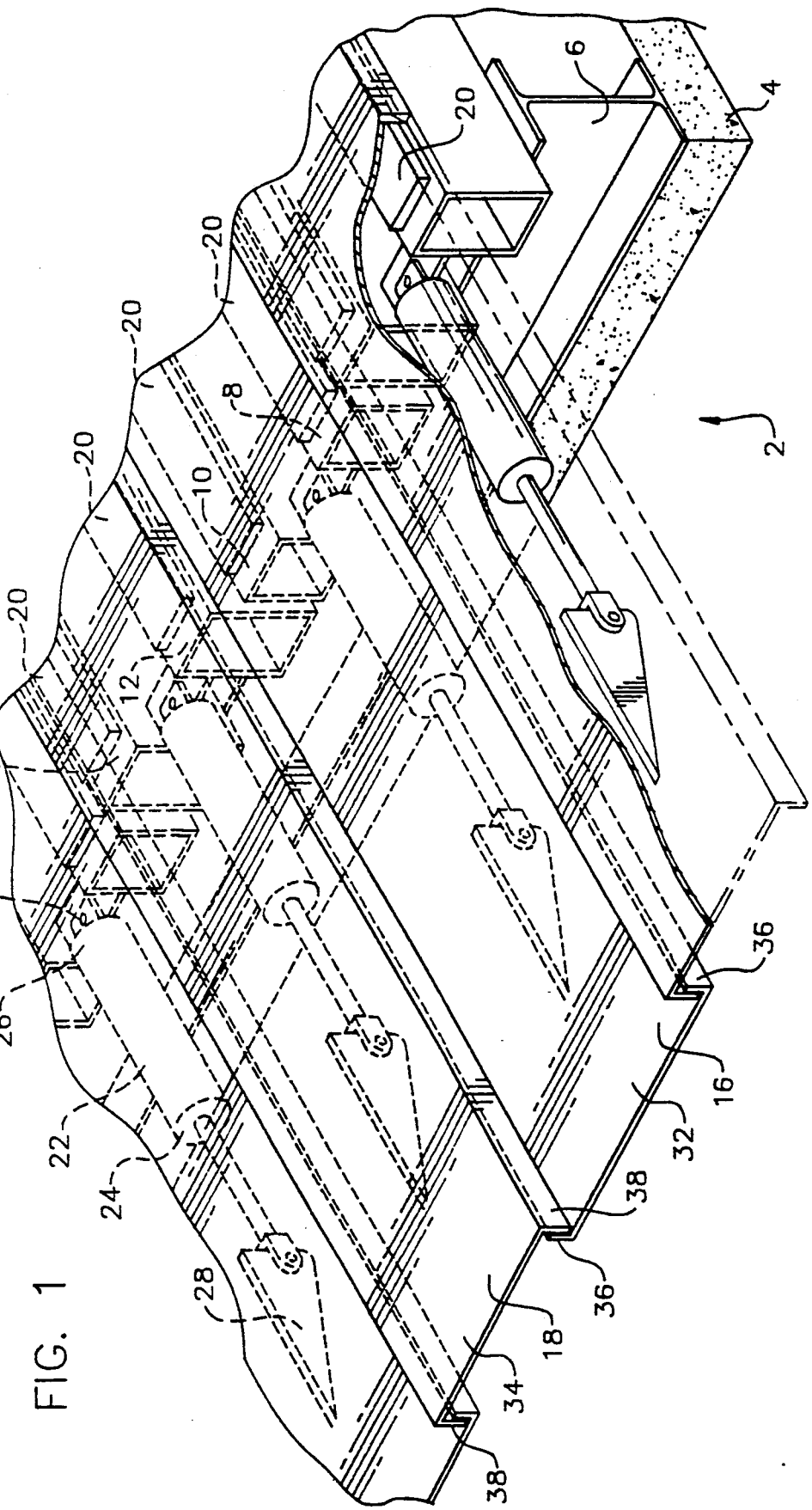
FIG. 1 is a perspective view of a fragmentary portion of a typical embodiment of the reciprocating floor construction of the present invention.
Figure 3:
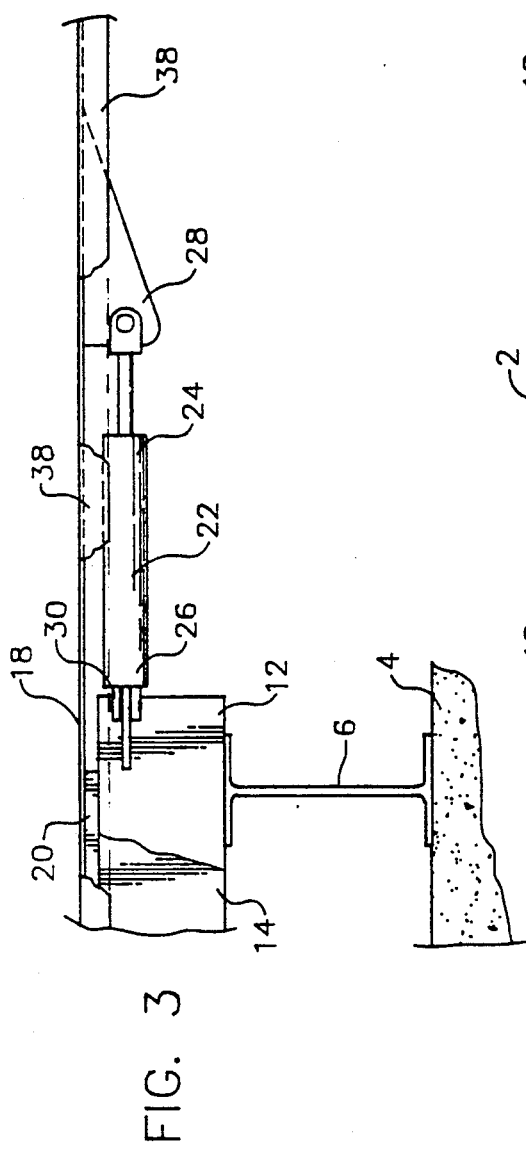
FIG. 3 is a fragmentary side view of a typical embodiment of the reciprocating floor construction of the present invention.
Figure 2:
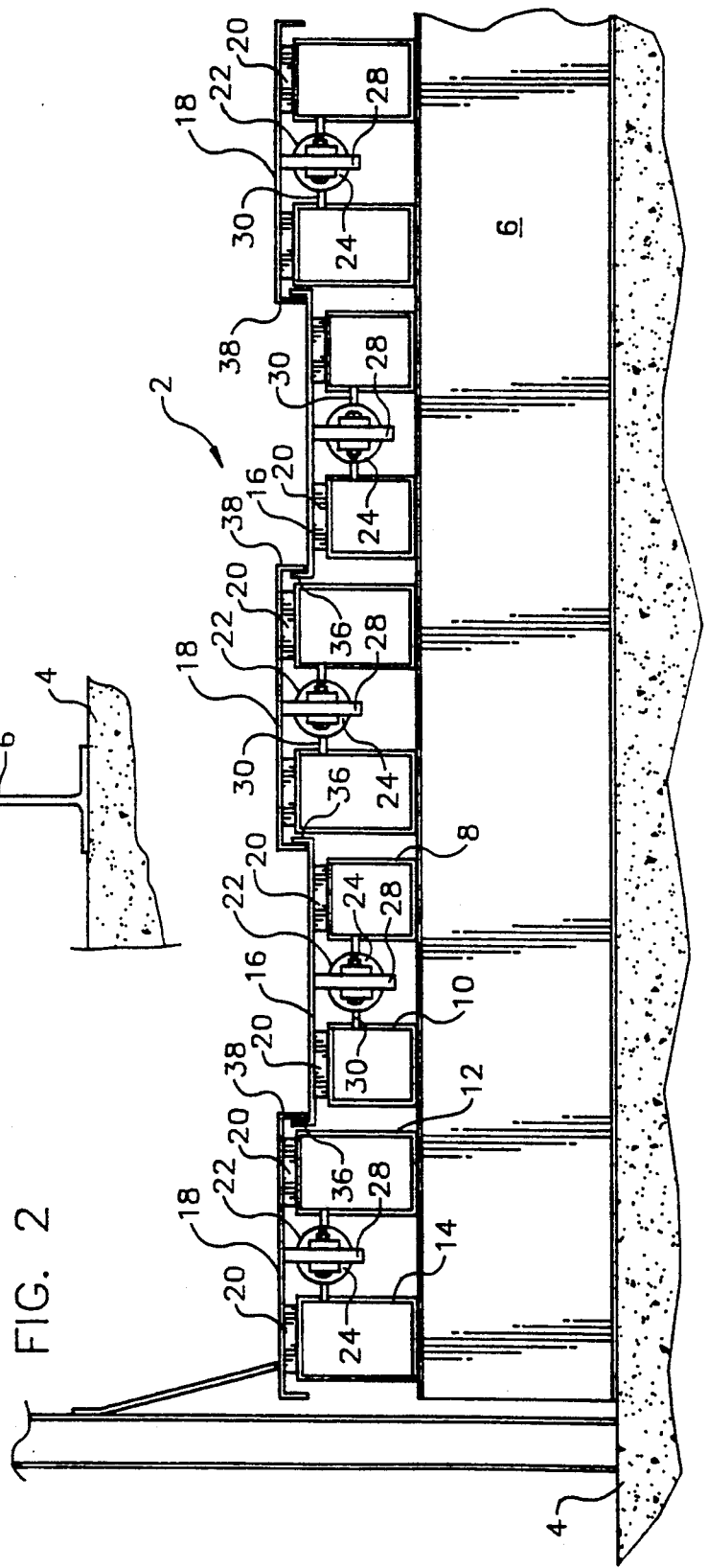
FIG. 2 is an end view of a typical embodiment of the reciprocating floor construction of the present invention.
Figure 4:
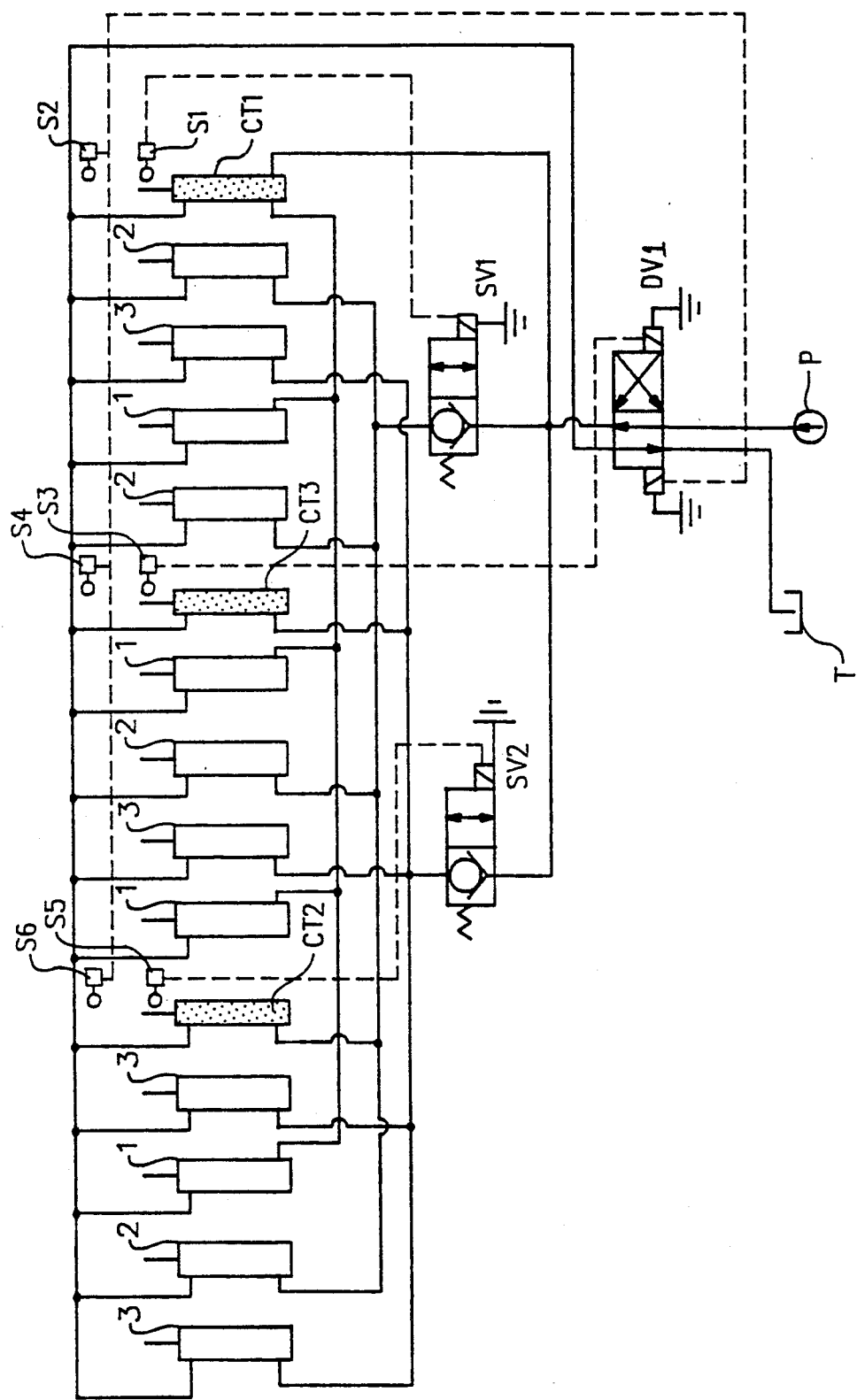
FIG. 4 is a schematic diagram of a fluid drive system employed with the present reciprocating floor 2 in which three groups of slidable slats are employed, with each slat having a separate fluid-driven cylinder.

Referring to FIGS. 1 through 3, reciprocating conveyor 2 comprises a plurality of groups of elongated slats extending longitudinally in the direction of conveying movement and are oriented side-by-side. Reciprocating conveyor 2 resides on floor 4 and includes a plurality of transverse frame beams 6 which form a supporting frame. A plurality of elongated base members 8, 10, 12, and 14 which are preferably hollow are located on transverse frame beams 6. A plurality of slats, including slats 16 and 18, are located on elongated base members 8, 10, 12 and 14. Three slats groups are shown in FIG. 4, however, it is to be understood that more than three slat groups can be employed. Each of the slat groups contains at least one slat, however, any number of slats greater than one can also be employed. All of slats 16 and 18 are capable of independent longitudinal reciprocation. The aforesaid reciprocation of slats 16 and 18 with respect to elongated base members 8, 10, 12 and 14 is facilitated by bearing 20 present therebetween.

The slat reciprocation is caused by a plurality of fluid-driven cylinders 22, with at least one fluid-driven cylinder 22 present for each slat group. Most preferably, a fluid-driven cylinder 22 is present for each and every of slats 16 and 18. Each fluid-driven cylinder includes a rod side 24 and a piston side 26 and pressurized hydraulic fluid is alternately fed into rod side 24 and piston side 26 to cause reciprocation of slats 16 and 18. More specifically, fluid flow into piston side 26 of fluid-driven cylinder 22 causes expansion of fluid-driven cylinder 22 and concommittent extension of slats 16 and 18 in the load conveying direction and passage of fluid into rod side 24 of fluid-driven cylinder 22 causes retraction of piston 22 and the associated retraction of slats 16 and 18 in the direction opposite to the direction of load conveyance. Fluid-driven cylinders 22 preferably connect elongate base members 6 and 10 to slats 16 and elongate base members 12 and 14 to slat 18 by slat flange 28 attached to slats 16 and 18, and by elongate base flange 28 attached to elongate base members 8, 10, 12, and 14.

Slat 16 has top 32 and sides 36, and slat 18 has top 34 and sides 38 such that slats 16 and 18 are preferably substantially U-shaped in cross section. Slats 16 and 18 are thus engaged, but individually slidable, through slidable engagement of a side 36 of slat 16 and a side 38 of slat 18. The aforesaid engagement of slats 16 and 18 prevent particulate matter of the load on top 32 of slat 16 and top 34 of slat 18 from either becoming trapped between or passing between the adjacent slats. In order to facilitate the above engagement of sides 36 of slat 16 and sides 38 of slat 18, elongate base members 8 and 10 of slat 16 have a height less than that of elongate base members 12 and 14 of slat 18 such that slat 18 is oriented at an altitude greater than that of slat 16 from transverse frame beams 6. The above-described staggered height of elongate base members 8 and 10 with respect to elongate base members 12 and 14 thus allow engagement of U-shaped slat 16 and inverted U-shaped slat 18 at the respective sides 36 and 38 thereof. Preferably, elongate base members 12 and 14 have a height between about 6 and about 8 inches, elongate base members 8 and 10 have a height between about 4 and about 6 inches, and the difference between the heights of elongate base members 8 and 10 and 12 and 14 is preferably between about 2 and 4 inches.

Referring now to FIG. 4, the fluid drive system employed with the present reciprocating floor conveyor 2 is described in which three groups of slidable slats are used, with each slat having a separate fluid-driven cylinder attached thereto. The fluid drive system preferably moves all of the slat groups simultaneously in an extended conveying direction and moves each of the slat groups sequentially in an opposite, retracted direction to cause load movement. Substantially equal distribution of the load on the slat groups provides substantially equal weight distribution on the slat groups. Thus, all of the slats of all of the groups generally extend simultaneously, and all of the slats within one slat group generally retract simultaneously. However, the above simultaneous extension of all slats of all slat groups and simultaneous retraction of all of the slats within one slat group is not critical (i.e., one or more slats carrying a greater load can lag) as long as the lagging slats do not extend or retract after the extension or retraction of the associated timing cylinder or cylinders, described below. Pump P, which is preferably a variable displacement pressure compensated pump designed to pump oil or other fluid, is connected to DV1, a two-position, four-way solenoid fluid directional valve. Also connected to DV1 is tank T which is a fluid reservoir well known in the art. DV1 has two fluid lines exiting therefrom. One fluid line connects tank T and pump P to the rod side of a plurality of fluid-driven cylinders divided into three groups, and designated cylinders 1, cylinders 2 and cylinders 3. Also communicating with tank T and pump P through DV1 are the rod sides of three fluid-driven timing cylinders CT1, CT2, and CT3. Each of timing cylinders CT1, CT2, and CT3 time the reciprocation of the fluid-driven cylinders of a particular slat group. For example, CT1 times the reciprocation of fluid-driven cylinders 1 of the first slat group, timing cylinder CT2 times the reciprocation of the fluid-driven cylinders 2 of the second slat group and timing cylinder CT3 times the reciprocation of the fluid-driven cylinders 3 of the third group. Preferably, a number of timing cylinders equal to the number of slat groups are present. It is to be noted that timing cylinders CT1, CT2, and CT3 are uniquely configured to have a displacement less than that of fluid-driven cylinders 1, 2 or 3. Preferably, the displacement of each of timing cylinders CT1, CT2, and CT3 is between about 25% and about 40% of the displacement of fluid-driven cylinders 1, 2, and 3. Thus, timing cylinders CT1, CT2 and CT3 all retract or extend after the retraction or extension of the respective cylinders 1, 2 or 3 associated with timing cylinders CT1, CT2 and CT3.

A second fluid outlet of DV1 connects pump P and tank T directly to the piston side of timing cylinder CT1 and cylinders 1 and indirectly to the piston side of timing cylinder CT2 and cylinders 2 through solenoid valve SV1, as well as indirectly to the piston sides of timing cylinders CT3 and cylinders 3 by solenoid valve SV2. Solenoid valves SV1 and SV2 allow free flow of fluid from pump P through DV1 and to the piston sides of the associated timing cylinders and drive cylinders of SV1 and SV2. However, SV1 and SV2 only allow fluid flow from the piston sides of their associated timing cylinders and drive cylinders through DV1 and to tank T if SV1 or SV2 is configured in its open, not its closed, position. Solenoid valves SV1 and SV2 thus are flow regulators which regulate fluid flow through their associated fluid-driven cylinders and timing cylinders.

Due to the above-described lesser displacement of timing cylinders CT1, CT2, and CT3 with respect to drive cylinders 1, 2 and 3, extension or retraction of cylinders 1, 2 and/or 3 will occur before extension or retraction of timing cylinders CT1, CT2, and/or CT3 because of the greater fluid pressure necessary to facilitate the extension or retraction of timing cylinders CT1, CT2, and CT3. More specifically, timing cylinder CT1, CT2, and CT3 function such that simultaneous extension, preferably substantially simultaneously, of all of the slat groups occurs upon retraction of the timing cylinder of the slat group that is sequentially the last to retract. Additionally, the timing cylinders' function is such that the slat groups sequentially retract only upon extension of the last to extend of the simultaneously extending timing cylinders, preferably with all of the slats with a particular slat group retracting substantially simultaneously.

In preferable operation, simultaneous extension of the three slat groups occurs as fluid from pump P passes through DV1, which is configured such that fluid simultaneously passes to the piston side of all of cylinders 1, 2, and 3 and of all of timing cylinders CT1, CT2 and CT3 for simultaneous extension thereof. After the aforesaid simultaneous slat group extension, limit switches S2, S4, and S6, which are connected in a series, are switched by the extension of timing cylinder CT1, CT2, and CT3, respectively. The series connection of limit switches S2, S4, and S6 requires that all of timing cylinders CT1, CT2, and CT3, and, therefore, all cylinders 1, 2, and 3 extend before directional valve DV1 switches to allow fluid flow to the rod side of all cylinders 1, 2, and 3 and of all of timing cylinders CT1, CT2, and CT3. However, since solenoid valves SV1 and SV2 are initially in their closed configurations, fluid does not flow from the piston side of cylinders 2 and 3 and timing cylinders CT2 and CT3 to tank T when directional valve DV1 allows fluid to flow to the rod sides of all of the fluid-driven cylinders an timing cylinders; but instead fluid only flows from the piston side of cylinders 1 and timing cylinder CT1 to tank T to retract these cylinders and the associated first slat group. The retraction of timing cylinder CT1 actuates limit switch S1, which configures solenoid valve SV1 into its open position to allow fluid to flow from the piston side of cylinders 2 and timing cylinder CT2 to tank T to cause retraction of these cylinders and of the second slat group.

Retraction of timing cylinder CT2 actuates the limit switch S5 which configures solenoid valve SV2 in its open position to allow fluid to flow from the piston side of cylinder 3 and of timing cylinder CT3 to tank T to retract the cylinders and the third slat group. Retraction of timing cylinder CT3 actuates limit switch S3 which configures directional valve DV1 for fluid from pump P to flow to the piston side of all cylinders 1, 2, and 3 and timing cylinders CT1, CT2, and CT3 for simultaneous extension of the now all-retracted three slat groups and associated cylinders. After the extension of cylinders 1, 2, and 3 and timing cylinder CT1, CT2, and CT3, limit switches 2, 4, and 6 are again actuated and directional valve DV1 is configured to allow fluid flow to the rod side of cylinders 1, 2, and 3 and of timing cylinders CT1, CT2, and CT3 for sequential retraction of the three slat groups based upon the above-described sequential configuration of solenoid SV1 and SV2.

While preferred embodiments of the invention have been illustrated and described it will be appreciated that various changes can be made therein without departing from the spirit and scope of the invention.

I claim:

1. A reciprocating floor construction comprising:
   a supporting frame;
   a plurality of base means on said supporting frame;
   a plurality of elongated, slidable slats mounted side-by-side and divided into at least a first group and a second group interleaved with said first group, said slats each having a top joining two sides, said first group and said second group oriented such that each of said slats of said first group is connected to said slats of said second group adjacent thereto through slidable engagement of said sides of said slats, said plurality of slats supported by said base means such that said first group is located a greater distance from said supporting frame than said second group; and
   drive means for causing longitudinal reciprocative movement of said plurality of slats.

2. The floor construction of claim 1 wherein said plurality of slats are substantially U-shaped in cross-section.

3. The floor construction of claim 1 further comprising:
   bearing means between each of said plurality of base means and said plurality of slats.

4. The floor construction of claim 1 wherein each of said plurality of base means is comprised of a pair of elongated base members oriented parallel with said plurality of slats.

5. The floor construction of claim 4 wherein said drive means is comprised of a separate drive cylinder attached to each of said plurality of slats and attached between each of said pair of said elongate base members.

6. The floor construction of claim 1 wherein said drive means is comprised of a plurality of drive cylinders causing reciprocation of said slats and timing cylinder means for coordinating energization of said drive cylinders and reciprocation of said slats.

7. The floor construction of claim 6 wherein said slats are divided into three interleaved groups and said timing cylinder means is a separate timing cylinder for each of said groups.

8. A reciprocating floor construction comprising:
   a supporting frame;
   a plurality of base means on said supporting frame;
   a plurality of elongated, slidable slats mounted side-by-side and divided into at least a first group and a second group interleaved with said first group, said plurality of slats supported by said base means such that said first group is located a greater distance from said supporting frame than said second group; and
   a separate drive cylinder attached to each slat for causing longitudinal reciprocative movement of said plurality of slats.

9. The floor construction of claim 8 wherein said plurality of slats have sides, are substantially U-shaped in cross-section and are interconnected through slidable engagement of said sides.

10. The floor construction of claim 8 further comprising:
    bearing means between each of said plurality of base means and said plurality of slats.

11. The floor construction of claim 8 wherein each of said plurality of base means is comprised of a pair of elongate base members oriented parallel with said plurality of slats.

12. The floor construction of claim 11 wherein each of said drive cylinders is attached to one of said plurality of slats and is attached between each of said pair of said elongate base members.

13. The floor construction of claim 8 further comprising timing cylinder means for coordinating energization of said drive cylinders and reciprocation of said slats.

14. The floor construction of claim 13 wherein said slats are divided into three interleaved groups and said timing cylinder means is a separate timing cylinder for each of said groups.

15. A reciprocating conveyor comprising:
    at least three slat groups having at least one slat member each, each of said slat groups being individually reciprocatable; and
    drive means engaging each slat member and operable to move all of said slat groups substantially simultaneously in an extended, conveying direction and to move each of said slat groups sequentially in an opposite, retracted direction, said drive means comprising;
    a fluid source;
    at least three fluid-driven cylinders each causing reciprocation of a slat group, each of said fluid-driven cylinders having a piston side and a rod side;
    a fluid-driven timing cylinder for each of said slat groups, each of said timing cylinders having a rod side, a piston side and a displacement less than that of said fluid-driven cylinders, said timing cylinders coordinating reciprocation of said fluid-driven cylinders;
    direction valve means having a first position in which said rod side of said fluid-driven cylinders and of said timing cylinders are connected to fluid flow from said fluid source, and having a second position in which said piston side of said fluid-driven cylinders and of said timing cylinders are connected to fluid flow from said fluid source;
    at least first flow regulating means and second flow regulating means connecting said fluid source and said piston side of said fluid-driven cylinders in a majority of said fluid-driven cylinders, said first flow regulating means and said second flow regulating means each having a first position in which fluid does not flow from said connected fluid-driven cylinders to said fluid source, and having a second position in which fluid flows from said connected fluid-driven cylinders to said fluid source;

means for controlling said direction valve means such that said direction valve means is moved from its first position to its second position after all of said slat members have retracted, and said direction valve means is moved from its second position to its first position after all of said slat members have extended; and means for controlling said first flow regulating means and said second flow regulating means such that when all of said slat members have been extended said first fluid regulating means and said second fluid regulating means are configured in their first positions where fluid does not flow from said connected fluid-driven cylinders to said fluid source such that fluid only flows from said fluid-driven cylinders not connected thereto to said fluid source resulting in retracting of at least a first slat group, said first flow regulating means is then configured in its second position where fluid flows from said connected fluid-driven cylinders to said fluid source resulting in retraction of at least a second slat group, said second flow regulating means is then configured in its second position where fluid flows from said connected fluid-driven cylinders to said fluid source resulting in retraction of at least a third slat group, and said means for controlling said direction valve means then orients said direction valve means in its second position to extend all of said slat members of said slat groups.

16. The reciprocating conveyor of claim 15 wherein said fluid-driven cylinders are equal in number to said slat members and each of said fluid-driven cylinders controls only one of said slat members.

17. The reciprocating conveyor of claim 15 wherein said fluid-driven timing cylinders coordinate reciprocation of said fluid-driven cylinders such that all of said fluid-driven cylinders are configured to extend until all of said fluid-driven cylinders have actually extended and such that all of said fluid-driven cylinders of each one of said slat groups are configured to retract until all of said fluid-driven cylinders of said slat group have actually retracted.

18. The reciprocating conveyor of claim 15 wherein said flow regulating means and said second flow regulating means are each connected to said piston side of said connected fluid-driven cylinders.

19. The reciprocating conveyor of claim 15 wherein said means for controlling said direction valve means moves said direction valve means from its second position to its first position upon extension of the last to extend of said simultaneously extending timing cylinders, and said means for controlling said direction valve means moves said direction valve means from its first position to its second position upon retraction of said timing cylinder of said slat group that is sequentially the last to react.

20. A reciprocating conveyor comprising:

at least three slat groups having at least one slat member each, each of said slat groups being individually reciprocatable; and drive means engaging each slat member and operable to move all of said slat groups substantially simultaneously in an extended, conveying direction and to move each of said slat groups sequentially in an opposite, retracted direction, said drive means comprising;

a fluid source;

at least three fluid-driven cylinders each causing reciprocation of a slat group and connected to said fluid source;

a fluid-driven timing cylinder for each of said slat groups, each of said timing cylinders having a displacement less than that of said fluid-driven cylinders, said timing cylinders connected to said fluid source and coordinating reciprocation of said fluid-driven cylinders; and means for controlling extension and retraction of said fluid driven cylinders based upon extension and retraction of said timing cylinders wherein said fluid-driven timing cylinders coordinate reciprocation of said fluid-driven cylinders such that all of said fluid-driven cylinders of all of said slat groups are simultaneously configured for extension to extend all of said slat groups substantially simultaneously and such that all of said fluid-driven cylinders of each one of said slat groups are sequentially configured to retract to sequentially retract each of said slat groups.

21. The reciprocating conveyor of claim 20 wherein said means for controlling extension and retraction of said fluid-driven cylinders extends said fluid-driven cylinders of all of said slat groups after retraction of said timing cylinder of said slat group that is sequentially the last to retract and then retracts said fluid-driven cylinders of different ones of said sequentially retracting slat groups, a different one of said sequentially retracting slat groups being retracted after retraction of a different one of said timing cylinders.

* * * * *